(12) United States Patent
Whitehead et al.

(10) Patent No.: US 9,746,148 B2
(45) Date of Patent: Aug. 29, 2017

(54) SUNLIGHT REDIRECTOR WITH FIXED MIRROR SEGMENTS

(71) Applicant: THE UNIVERSITY OF BRITISH COLUMBIA, Vancouver (CA)

(72) Inventors: Lorne Whitehead, Vancouver (CA);
Allen James Upward, Vancouver (CA);
Peter George Friedel, Burnaby (CA);
Jon David Edward Scott, Salt Spring Island (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 14/786,943

(22) PCT Filed: Apr. 24, 2014

(86) PCT No.: PCT/CA2014/000368
§ 371 (c)(1),
(2) Date: Oct. 23, 2015

(87) PCT Pub. No.: WO2014/172779
PCT Pub. Date: Oct. 30, 2014

(65) Prior Publication Data
US 2016/0178150 A1 Jun. 23, 2016

Related U.S. Application Data

(60) Provisional application No. 61/815,552, filed on Apr. 24, 2013.

(51) Int. Cl.
*F21S 11/00* (2006.01)
*E06B 9/24* (2006.01)
(Continued)

(52) U.S. Cl.
CPC .......... *F21S 11/002* (2013.01); *E04D 13/033* (2013.01); *E04D 13/0354* (2013.01);
(Continued)

(58) Field of Classification Search
CPC ... F21S 11/002; F21S 11/007; G02B 19/0042; F21V 14/04; F21V 7/0033
(Continued)

(56) References Cited

U.S. PATENT DOCUMENTS

| 4,883,340 | A | | 11/1989 | Dominguez |
| 5,285,315 | A | * | 2/1994 | Stiles ........................ E06B 9/24 359/592 |

(Continued)

FOREIGN PATENT DOCUMENTS

| JP | 06313835 | 11/1994 |
| JP | 2013045640 | 3/2013 |

(Continued)

*Primary Examiner* — Christopher Mahoney
(74) *Attorney, Agent, or Firm* — Oyen Wiggs Green & Mutala LLP (57) ABSTRACT

A sunlight redirector has a first mirror array formed of a first plurality of substantially parallel, uniformly spaced, longitudinal outward mirror segments; and a second mirror array formed of a second plurality of substantially parallel, uniformly spaced, longitudinal inward mirror segments. Each mirror segment has a normal vector. The outward mirror segments are adjustably positionable, such that their normal vectors remain parallel. The first mirror array is rotatable about a normal vector of the sunlight redirector. The inward mirror segments may remain fixed in position at all times; or they may be moved, twice per day, between first and second fixed positions.

19 Claims, 7 Drawing Sheets

(51) Int. Cl.
*F21V 14/04* (2006.01)
*F21V 7/00* (2006.01)
*F21V 7/05* (2006.01)
*E04D 13/03* (2006.01)
*E04D 13/035* (2006.01)
*G02B 17/00* (2006.01)
*G02B 19/00* (2006.01)
*G02B 26/08* (2006.01)

(52) U.S. Cl.
CPC ............. *E06B 9/24* (2013.01); *F21V 7/0033* (2013.01); *F21V 7/05* (2013.01); *F21V 14/04* (2013.01); *G02B 17/002* (2013.01); *G02B 17/006* (2013.01); *G02B 19/0019* (2013.01); *G02B 19/0042* (2013.01); *G02B 26/0816* (2013.01); *E04D 2013/034* (2013.01); *E06B 2009/2417* (2013.01)

(58) Field of Classification Search
USPC ......................................... 359/592, 596–597
See application file for complete search history.

(56) References Cited

U.S. PATENT DOCUMENTS

| | | | |
|---|---|---|---|
| 5,999,323 | A | 12/1999 | Wood |
| 7,352,509 | B2 * | 4/2008 | Pagel .................... E04D 13/033 136/251 |
| 8,928,981 | B2 * | 1/2015 | Whitehead ............. E04D 13/03 359/592 |
| 9,057,535 | B2 * | 6/2015 | Frazier ................... F24J 2/0433 |
| 2012/0126098 | A1 | 5/2012 | Bartenbach |
| 2013/0120844 | A1 * | 5/2013 | Freier ................ G02B 19/0023 359/596 |

FOREIGN PATENT DOCUMENTS

| | | |
|---|---|---|
| WO | 2009000070 | 12/2008 |
| WO | 2013059908 | 5/2013 |

\* cited by examiner

SUNLIGHT REDIRECTOR WITH FIXED MIRROR SEGMENTS

This application claims the benefit of priority to U.S. Provisional Application No. 61/815,552 filed on Apr. 24, 2014. These and all other extrinsic materials referenced in this document are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is mechanisms for redirecting light, particularly sunlight.

BACKGROUND

The following description includes information that may be useful in understanding the present invention. It is not an admission that any of the information provided herein is prior art or relevant to the presently claimed invention, or that any publication specifically or implicitly referenced is prior art.

Figure 1:
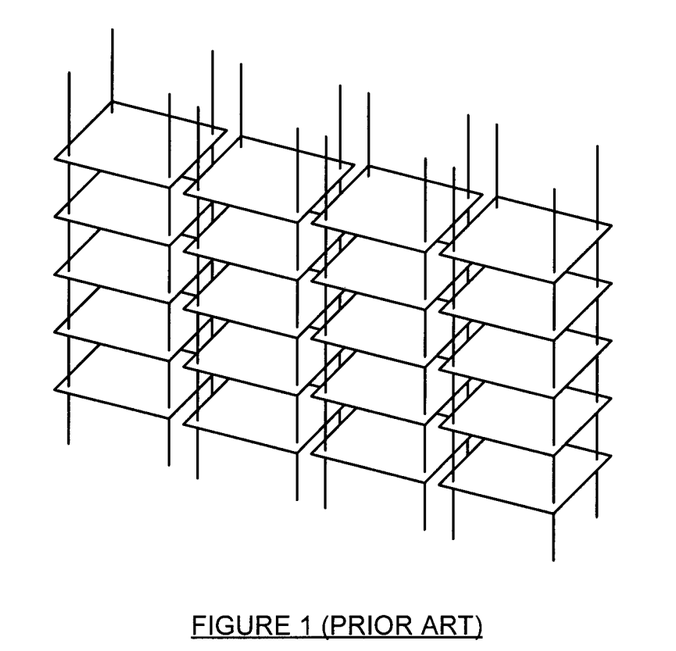
FIG. 1 isometrically and schematically depicts a prior art mirror array as disclosed in WO 2009/000070.

WO 2009/000070, which is incorporated herein by reference, describes a sunlight redirector in which longitudinally adjacent plane mirrors are pivotally interconnected by non-stretching linkages to form a columnar array (see FIG. 1 hereof). The non-stretching linkages constrain movement of the mirrors such that their normal vectors remain parallel. Pivotable couplings (not shown in FIG. 1 hereof, but see WO 2009/000070) permit movement of the mirrors with respect to two mutually perpendicular axes and prevent movement of the mirrors with respect to a third axis which is perpendicular to the other two axes. Actuators (not shown in FIG. 1 hereof, but see WO 2009/000070) controllably move the mirrors to orient their normal vectors such that the mirrors reflect incident light in a desired direction. The actuators can be adaptively controlled to move the mirrors to track the sun, and thereby continually redirect sunlight into a specific direction, e.g. through a wall opening to illuminate the interior of a building.

Such mirror arrays are useful in building core daylight illumination systems, as explained in WO 2009/000070. It is desirable that such mirror arrays be thin, to facilitate mounting the arrays on or within building walls. A thin mirror array can be formed from a large number of small mirrors. However, a disadvantage of this approach is that the required number of mirrors increases in inverse proportion to the square of the thickness of the array, potentially prohibitively increasing the cost of constructing a suitably thin array. Thus, there is still a need for improved sunlight redirectors and mirror arrays.

SUMMARY OF THE INVENTION

The inventive subject matter provides apparatuses, systems and methods of redirecting sunlight. In some aspects of the inventive subject matter, a sunlight redirector comprises a first mirror array comprising a plurality of substantially parallel or parallel, uniformly spaced, longitudinal outward mirror segments. A second mirror array comprising a second plurality of substantially parallel or parallel, uniformly spaced, longitudinal inward mirror segments could also be provided, wherein each of the outward and inward mirror segments have a normal vector. It is contemplated that the outward mirror segments could be adjustably positionable such that some or all of the outward mirror segments normal vectors remain parallel. It is also contemplated that the first mirror array could be rotatable about a normal vector of the sunlight redirector.

Additionally or alternatively, the inward mirror segments could remain fixed in position, or be movable between two or more fixed positions. Additionally or alternatively, the second mirror array could be rotatable about the normal vector of the sunlight redirector.

In some aspects, at least one of the inward mirror segments and the outward mirror segments could comprise different lengths and be arranged such that the first mirror array is circular. Additionally or alternatively, the mirror segments could redirect incident light rays into a desired direction that is substantially (e.g., within 20% or more preferably within 10% or even within 5%) parallel to the normal vector of the sunlight redirector. Still further, the angular orientation of the inward mirror segments could be selected such that light rays reflected by the outward mirror segments onto the inward mirror segments are redirected by the inward mirror segments into a desired direction that is substantially parallel to the normal vector of the sunlight redirector.

In other aspects, a method of redirecting sunlight is provided comprising the steps of providing a first mirror array comprising a plurality of substantially parallel, uniformly or substantially uniformly spaced, longitudinal outward mirror segments, some or all of the outward mirror segments having a normal vector, and providing a second mirror array comprising a plurality of substantially parallel, uniformly or substantially uniformly spaced, longitudinal inward mirror segments, each one of the inward mirror segments having a normal vector. Additionally or alternatively, methods of the inventive subject matter could comprise tracking the sun by adjustably positioning the outward mirror segments while maintaining substantially parallel alignment of the segments' normal vectors, and rotating the first mirror array about a normal vector of the first and second mirror arrays.

Additionally or alternatively, some contemplated methods could comprise maintaining the inward mirror segments in a fixed position. This step could optionally comprise maintaining the inward mirror segments in a fixed position in which light rays reflected by the outward mirror segments onto the inward mirror segments are redirected by the inward mirror segments into a desired direction that is substantially parallel to the normal vector of the first and second mirror arrays.

Additionally or alternatively, contemplated methods could comprise maintaining the inward mirror segments in one or more of a first and second fixed position. Additionally or alternatively, contemplated methods could comprise maintaining angular orientation of the inward mirror segments such that light rays reflected by the outward mirror segments onto the inward mirror segments are redirected by the inward mirror segments into a desired direction substantially parallel to the normal vector of the first and second mirror arrays.

Additionally or alternatively, contemplated methods could comprise moving the inward mirror segments from the second fixed position into the first fixed position at one or more selected times or time ranges (e.g., within 30 minutes, within 15 minutes, within 5 minutes of a selected time, etc.) on one or more days. The selected times could be, for example, two hours apart (e.g., 11 AM and 1 PM, etc.) once per day for a period of 1, 2, 5, 10, 15, 20, 100 or even more days. Additionally or alternatively, when the inward mirror segments are in a first fixed position, light rays incident upon the outward segments could be reflected onto the inward segments and further reflected by the inward segments in a desired direction that is substantially parallel to the normal vector of the first and second mirror arrays. Furthermore, when the inward mirror segments are in the second fixed position, lights rays incident upon the outward segments could be reflected in the desired direction by the outward segments without being further reflected by the inward segments.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As further described below, some of the disadvantages described above with respect to the prior art can be addressed or solved as explained below in relation to FIGS. 2, 3A, 3B, 3C, 4, 5A, 5B, 5C and 5D showing some aspects of the inventive subject matter.

Sunlight redirectors as described in relation to FIGS. 2, 3A, 3B, 3C, 4, 5A, 5B, 5C and 5D can redirect light into a light guide or shaft for many sun positions, except when the sun is positioned such that the light rays incident on the redirector already have approximately the correct angular orientation and thus require comparatively little redirection. In such cases the sun's position relative to the redirector may be such that light rays incident on the redirector have approximately the correct angular orientation and require only little redirection. For example, if light rays are incident on the redirector at glancing incidence angles, only a very small fraction of the rays will be redirected—a significant fraction of the light rays will pass through the redirector without being redirected, thus reducing the overall efficiency of the redirector.

The light guide may be oriented as an approximately vertical shaft that brings sunlight from an aperture in the roof of a building downward into an interior space, where the sunlight is then used for general illumination or aesthetic lighting purposes. The efficiency reduction described above is most prominent for such light guides in geographical locations closer to the equator, in the 35° N to 35° S latitude band, where the sun is located at high altitude (e.g. predominantly directly overhead) at midday. For such locations, a redirector formed of a plurality of parallel mirror segments cannot efficiently redirect sunlight during an approximately 2 hour period around midday, for example, which could be when one would expect maximum sunlight illumination in the interior space.

The approach described below in relation to FIGS. 5A, 5B, 5C and 5D can be effective in geographical locations closer to the equator, but the additional cost and complexity of providing adjustably positionable inward mirror segments 60A, 62A, 64A, 66A may not be warranted in all cases. This disclosure addresses, among other things, an alternate approach for improving efficiency without substantially increasing cost and complexity.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 5A, 5B, 5C and 5D are side elevation schematic depictions of four pairs of longitudinal mirror segments.

FIGS. 6A and 6B are side elevation schematic depictions of an outward array of adjustably positionable longitudinal mirror segments and an inward array of fixed position longitudinal mirror segments.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 2:
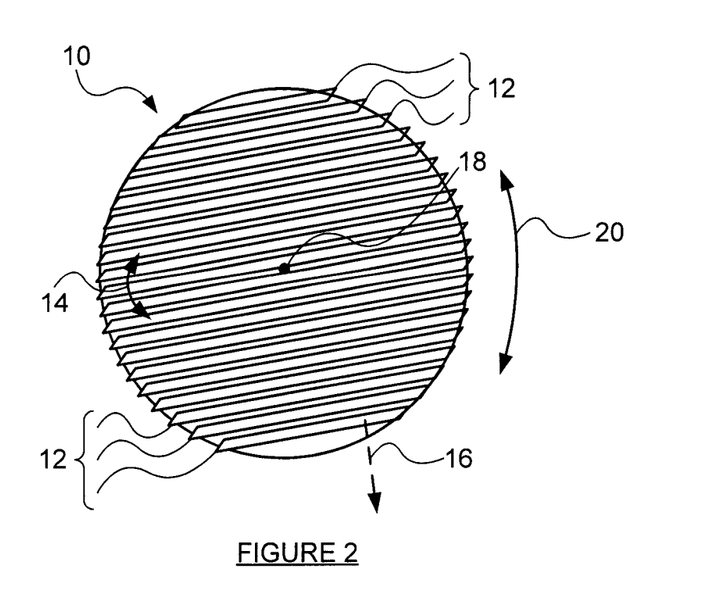
FIG. 2 is a front elevation depiction of a circularly rotatable mirror array having a plurality of longitudinal, pivotable mirrors.

FIG. 1 illustrates an existing mirror array. FIG. 2 depicts a sunlight redirector 10 having a plurality of substantially parallel, uniformly spaced, longitudinal mirror segments 12. Segments 12 are interconnected (not shown) in a manner similar to that used to interconnect Venetian blind slats. A controller (not shown) coupled to one or more of segments 12 can be selectably actuated to simultaneously pivot all of segments 12, as indicated by double-headed arrow 14. Segments 12 can thus be pivotally adjusted, in the manner of a Venetian blind, such that their respective normal vectors 16 remain parallel. Segments 12 are of differing lengths, and are arranged such that sunlight redirector 10 has a circular front elevational shape as seen in FIG. 2. Sunlight redirector 10 is rotatable about its normal vector 18, as indicated by double-headed arrow 20.

Sunlight redirector 10 can thus be rotated to track the sun's azimuthal motion relative to the array's normal vector 18, and segments 12 can be pivotally adjusted to compensate for changes in the sun's altitude, so that light rays reflected by segments 12 will be redirected in a desired, fixed direction, e.g. substantially parallel to normal vector 18 to facilitate redirection of light rays through a wall opening to illuminate the interior of a building.

Figure 3A:
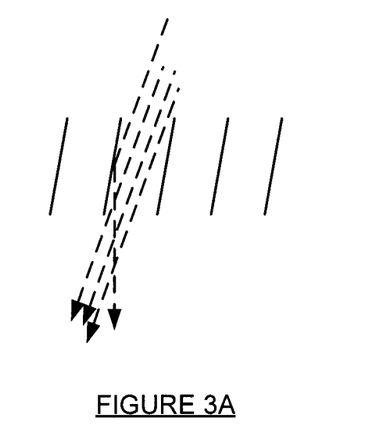
FIGS. 3A, 3B and 3C are side elevation schematic depictions of several interconnected longitudinal mirror segments, respectively depicting positioning of the segments to achieve small, intermediate and large angular redirection of incident light rays.
Figure 3B:
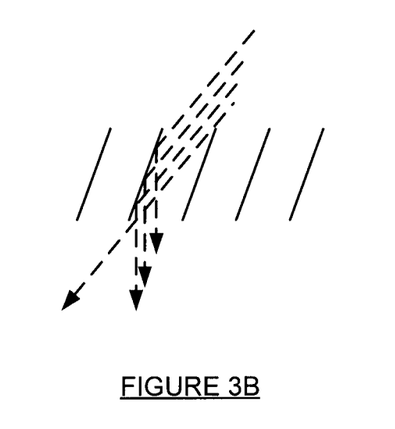
Figure 3C:
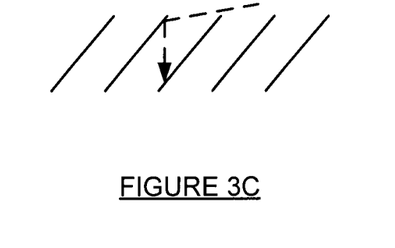

FIGS. 3A, 3B and 3C illustrate a potential disadvantage of using sunlight redirector 10's segments 12 to redirect light—redirection efficiency depends on the desired redirection angle. FIG. 3A depicts a small redirection angle situation in which the mirror segments (represented by solid lines) are nearly parallel to the incident light, so most rays (represented by dashed lines) do not strike the mirrors and are therefore not redirected as desired. FIG. 3B depicts an intermediate situation in which the mirror segments are obliquely angled relative to the incident light, with most rays striking the mirrors and being redirected as desired. FIG. 3C depicts a situation in which the desired redirection angle is so large that the mirror segments are positioned at such a large oblique angle relative to the incident light that most rays which strike the mirrors are redirected onto an adjacent mirror, then further redirected away from the desired direction. The FIGS. 3A and 3C situations are often problematic since it is desirable to redirect rays corresponding to a wide range of sun angles.

Figure 4:
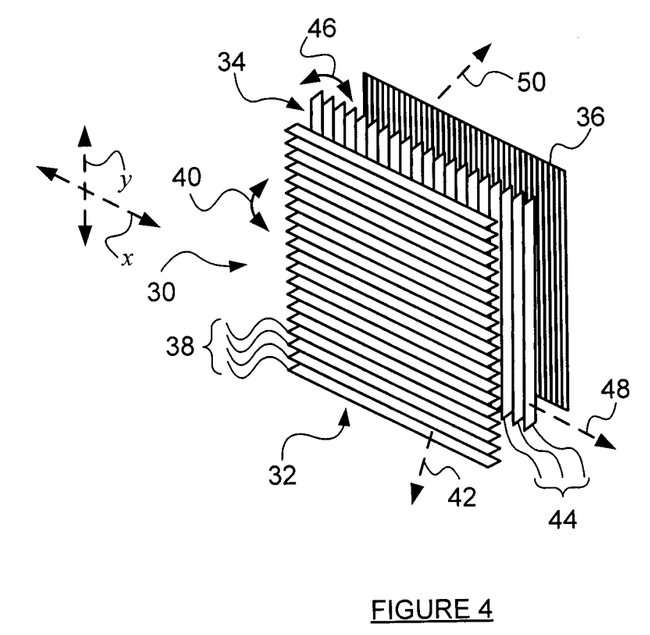
FIG. 4 isometrically depicts a rectangular mirror array having a first plurality of longitudinal, pivotable mirrors, a second plurality of longitudinal, pivotable mirrors which extend substantially perpendicular to the first plurality mirrors, and a prismatic sheet.

Another potential disadvantage of sunlight redirector 10 is possible increased complexity and cost in rotatably moving sunlight redirector 10 about normal vector 18. FIG. 4 depicts an embodiment wherein a stationary sunlight redirector could address the foregoing potential disadvantages.

Stationary sunlight redirector 30 has a first mirror array 32, a second mirror array 34 and a prismatic sheet 36. First mirror array 32 is formed of a first plurality of substantially parallel, uniformly spaced, longitudinal mirror segments 38. Segments 38 are mirrored on either one or both sides, depending on the expected range of directions of the incident sunlight; and are interconnected (not shown) in a manner similar to that used to interconnect Venetian blind slats. A controller (not shown) coupled to one or more of segments 38 can be selectably actuated to simultaneously pivot all of segments 38, as indicated by double-headed arrow 40. Segments 38 can thus be pivotally adjusted, in the manner of a Venetian blind, such that their respective normal vectors 42 remain parallel. Segments 38 are of equal lengths, and are arranged such that first mirror array 32 has a rectangular front elevational shape as seen in FIG. 4.

Second mirror array 34 is formed of a second plurality of substantially parallel, uniformly spaced, longitudinal mirror segments 44. Segments 44 are mirrored on either one or both sides, depending on the expected range of directions of the incident sunlight; and are interconnected (not shown) in a manner similar to that used to interconnect Venetian blind slats. A controller (not shown) coupled to one or more of segments 44 can be selectably actuated to simultaneously pivot all of segments 44, as indicated by double-headed arrow 46. Segments 44 can thus be pivotally adjusted, in the manner of a Venetian blind, such that their respective normal vectors 48 remain parallel. Segments 44 are of substantially equal lengths, and are arranged such that second mirror array 34 has a rectangular front elevational shape as seen in FIG. 4.

First mirror array 32 is positioned in front of and in close proximity to second mirror array 34 with mirror segments 38 extending in a first direction x, and mirror segments 44 extending in a second direction y which is substantially perpendicular to the first direction x. Prismatic sheet 36 is positioned behind and in close proximity to second mirror array 34.

First mirror array 32 can be pivotally adjusted to compensate for changes in the sun's altitude such that light rays reflected by segments 38 are redirected in a desired, fixed direction, e.g. toward prismatic sheet 36. Second mirror array 34 can be pivotally adjusted to compensate for changes in the sun's azimuth such that light rays reflected by segments 44 are also redirected in a desired, fixed direction, e.g. toward prismatic sheet 36.

Light rays redirected toward prismatic sheet 36 by either of first or second mirror arrays 32, 34 are refracted (i.e. redirected) by prismatic sheet 36 into a final desired fixed direction substantially parallel to the normal vector 50 of sunlight redirector 30. For example, the final desired fixed direction can be such that the rays are redirected through a wall opening to illuminate the interior of a building. Light rays redirected by first and second mirror arrays 32, 34 are efficiently redirected by prismatic sheet 36. Neither first mirror array 32 alone, nor second mirror array 34 alone, will efficiently redirect sunlight rays in situations where very little redirection is required. This corresponds to the disadvantage depicted in FIG. 3A. Prismatic sheet 36 compensates by imparting further substantial redirection of the light rays in such situations, thus improving efficiency. For example, without prismatic sheet 36, sunlight redirection efficiency of an array mounted on a south wall would be very low while the sun is due south.

The side of prismatic sheet 36 facing toward second mirror array 34 may be flat. The opposite side of prismatic sheet 36 may bear a large plurality of vertically extending 70° internal whole angle isosceles triangle prisms. Sheet 36 can be formed of a transparent polymeric material such as polycarbonate (PC), polyethyleneterephthalate (PET), polymethyl methacrylate (PMMA), or a combination of PC, PET and/or PMMA. 2370 optical lighting film available from 3M, St. Paul, Minn. can be used to form sheet 36. The precise angle and size of the film's prisms is not highly critical—generally the desired characteristic is that light rays that are oriented roughly 30° (between 10° and 50°) to the left or to the right of perpendicular will be efficiently refracted by the film into a direction which is substantially perpendicular to the macroscopic plane of sheet 36. Consequently, light rays redirected by first and second mirror arrays 32, 34 do not need to be perpendicular to sunlight redirector 30 as a whole—which in any case is a difficult constraint to satisfy at times near solar noon.

Although sheet 36 improves sunlight redirector 30's efficiency for problematic sun angles (e.g. at times near solar noon), it may not satisfactorily accommodate all desired light redirection angles. Furthermore, light refracted through sheet 36 may be redirected in slightly different directions, depending on the wavelength of the incident light. These disadvantages can be circumvented as discussed below in relation to FIGS. 5A-5D.

FIGS. 5A-5D each depict four pairs of longitudinal inward/outward mirror segments 60A, 60B; 62A, 62B; 64A, 64B; and 66A, 66B (represented by solid lines). Each mirror segment 12 in sunlight redirector 10 may be one such pair of inward/outward segments. Similarly, each mirror segment 38 and/or each mirror segment 44 in sunlight redirector 30 may be one such pair of inward/outward segments. Mirror segments 60A, 60B; 62A, 62B; 64A, 64B; and 66A, 66B are mirrored on both sides.

Figure 5A:
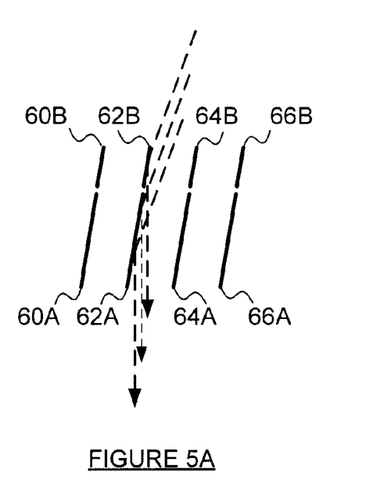
FIG. 5A depicting substantially parallel alignment of the segments in each pair.
Figure 5B:
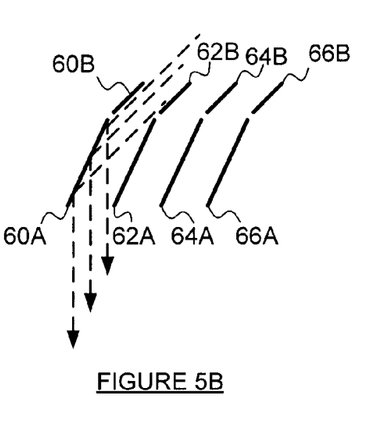
FIG. 5B depicting alignment of one segment in each pair in a direction substantially parallel to a dominant direction of incident sunlight rays.
Figure 5C:
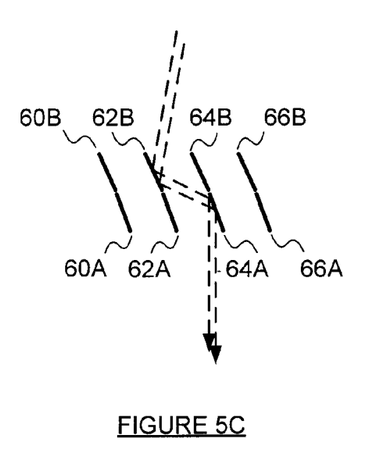
FIG. 5C depicting alignment of the outward segments to direct incident light onto adjacent inward segments.
Figure 5D:
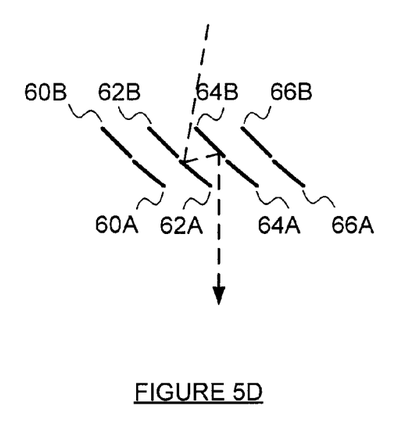
FIG. 5D depicting alignment of the inward segments to direct incident light onto adjacent outward segments.

Outward segments 60B, 62B, 64B and 66B are adjustable with respect to inward segments 60A, 62A, 64A and 66A respectively. FIG. 5A depicts adjustment to align the inward and outward segments in each pair substantially parallel to one another. FIG. 5B depicts adjustment of the segments to align the outward segment in each pair in a direction which is substantially parallel to the dominant direction of incident sunlight rays (depicted as dashed arrows in FIGS. 5A-5D). FIG. 5C depicts adjustment of the segments such that incident light rays are first reflected by the outward segments onto the adjacent inward segments, then further reflected in the desired direction by the inward segments. FIG. 5D depicts adjustment of the segments such that incident light rays are first reflected by the inward segments onto the adjacent outward segments, then further reflected in the desired direction by the outward segments.

The different segment adjustment configurations depicted in FIGS. 5A-5D yield different light redirection efficiencies which depend on factors such as the segments' sizes and the incident light angle. The segments can be automatically selectably adjusted by a suitable control system to adopt any of the depicted adjustment configurations (or any desired intermediate adjustment configuration) in order to maximize light redirection efficiency at different times. Generally, the best choice at any particular time will be the adjustment configuration that minimizes total loss of useful light rays (i.e. light rays which pass through the sunlight redirector without being redirected are "lost" in the sense that they are not redirected into the desired direction). In all cases, the inward/outward mirror segments are adjustably positioned taking into account both the sunlight incidence angle and the desired direction into which the light rays are to be redirected. The required mirror segment positions can be readily determined for any selected sunlight incidence angle by well known ray trace analysis techniques. The so-determined mirror segment position data can be stored in a look-up table or emulated in various forms of open loop mathematical algorithms or feedback-based closed loop algorithms, or some combination thereof. Such lookup table and algorithmic techniques are well known to persons skilled in the art. In some cases, the FIG. 4 stationary sunlight redirector 30 can be formed without prismatic sheet 36, if mirror segments 38 and/or 44 are suitably formed of inward/outward segments as aforesaid.

Figure 6A:
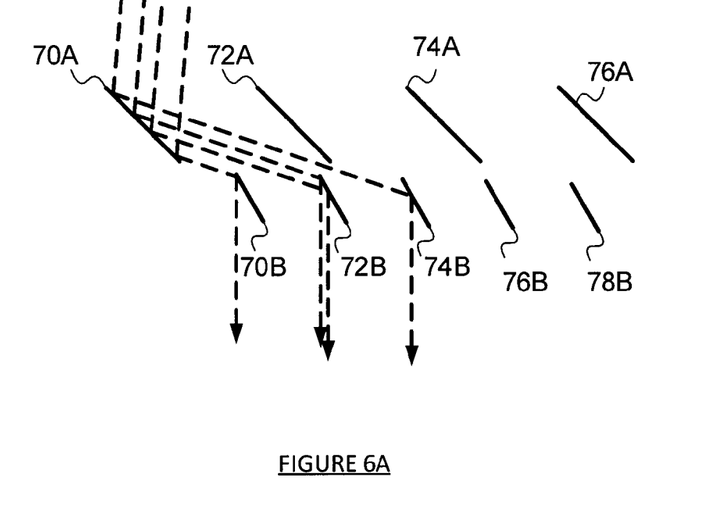
FIG. 6A depicts the inward segments in a first fixed position in which the outward segments redirect incident light onto the inward segments which further redirect the light.
Figure 6B:
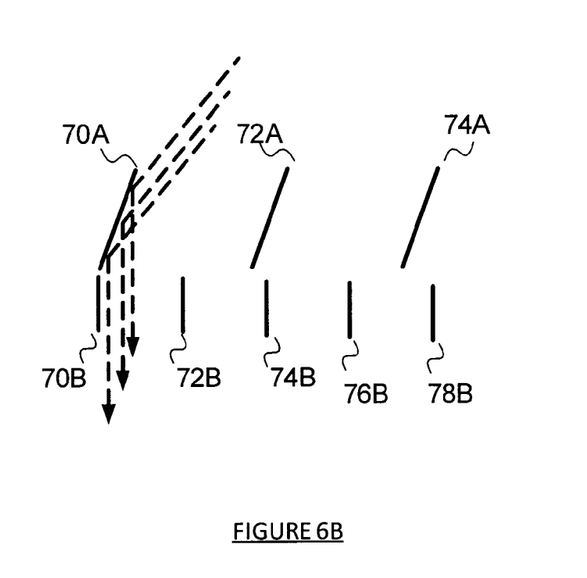
FIG. 6B depicts optional movement of the inward segments from the first fixed position into a second fixed position in which incident light redirected by the outward segments does not encounter the inward segments.

FIGS. 6A and 6B each depict a first plurality of substantially parallel, uniformly spaced longitudinal outward mirror segments 70A, 72A, 74A, 76A and a second plurality of substantially parallel, uniformly spaced longitudinal inward mirror segments 70B, 72B, 74B, 76B, 78B (represented by solid lines). Each mirror segment 12 in sunlight redirector 10 may be one or more of such outward/inward segments. Similarly, each mirror segment 38 and/or each mirror segment 44 in sunlight redirector 30 may be one or more of such outward/inward segments. Mirror segments 70A, 72A, 74A, 76A; and 70B, 72B, 74B, 76B, 78B need only be mirrored on one side.

Outward segments 70A, 72A, 74A, 76A are adjustably positionable throughout a range of sun-tracking positions. Inward segments 70B, 72B, 74B, 76B, 78B either remain fixed in position at all times as shown in FIG. 6A; or they may be moved, twice per day, between the first and second fixed positions shown in FIGS. 6A and 6B respectively.

FIG. 6A depicts adjustable positioning of outward segments 70A, 72A, 74A, 76A such that incident light rays (depicted as dashed arrows in FIGS. 6A and 6B) are first reflected by the outward segments onto inward segments 70B, 72B, 74B, 76B, 78B; then further reflected in the desired direction by the inward segments. Outward segments 70A, 72A, 74A, 76A are adjustably repositioned throughout the day to track the sun, whereas inward segments 70B, 72B, 74B, 76B, 78B may at all times remain in the first fixed position shown in FIG. 6A.

Alternatively, for example, if the additional cost and complexity can be justified, provision (not shown) can optionally be made for moving inward segments 70B, 72B, 74B, 76B, 78B twice per day. Specifically, once per day at about 11:00 am, inward segments 70B, 72B, 74B, 76B, 78B can be moved from the second fixed position shown in FIG. 6B into the first fixed position shown in FIG. 6A and left in the first fixed position for about 2 hours (i.e. until about 1:00 pm). Then, once per day at about 1:00 pm, inward segments 70B, 72B, 74B, 76B, 78B can be moved from the first fixed position back into the second fixed position and left in the second fixed position until about 11:00 am on the next day. When inward segments 70B, 72B, 74B, 76B, 78B are in the second fixed position shown in FIG. 6B incident light rays are reflected in the desired direction by outward segments 70A, 72A, 74A, 76A without being further reflected by the inward segments.

The angular orientation of inward segments 70B, 72B, 74B, 76B, 78B does not change while the inward segments are in the first fixed position shown in FIG. 6A. Similarly, if the inward segments are moved into the second fixed position shown in FIG. 6B the angular orientation of inward segments 70B, 72B, 74B, 76B, 78B does not change while the inward segments are in the second fixed position.

Outward segments 70A, 72A, 74A, 76A can thus be adjustably positioned to redirect a substantial fraction of incident sunlight rays for all sun positions, while inward segments 70B, 72B, 74B, 76B, 78B remain in the first fixed position shown in FIG. 6A to impart a desired angular correction to the light rays. Movement of inward segments 70B, 72B, 74B, 76B, 78B into the optional second fixed position shown in FIG. 6B improves sunlight redirection efficiency at the beginning and end of the day since outward segments 70A, 72A, 74A, 76A are sufficient to redirect light at such times.

In embodiments which utilize the optional second fixed position shown in FIG. 6B, the position of inward segments 70B, 72B, 74B, 76B, 78B as shown in FIG. 6A is selected to optimize sunlight redirection efficiency during the 11:00 am to 1:00 pm time interval. This may require some trade-off in redirection efficiency at other times of the day. By facilitating movement of inward segments 70B, 72B, 74B, 76B, 78B twice per day between the first and second fixed positions, the optional FIG. 6B configuration can attain higher overall sunlight redirection efficiency throughout the day. In some applications this may justify the added cost and complexity of making provision for such movement of the inward segments.

Figure 7A:
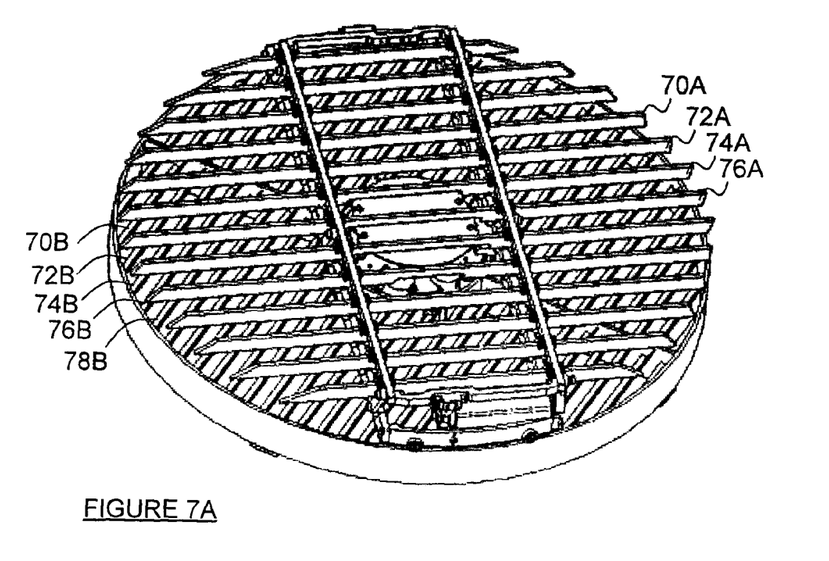
FIGS. 7A and 7B are respectively oblique and top plan views of the outward side of a sunlight redirector corresponding to FIG. 6A.
Figure 7B:
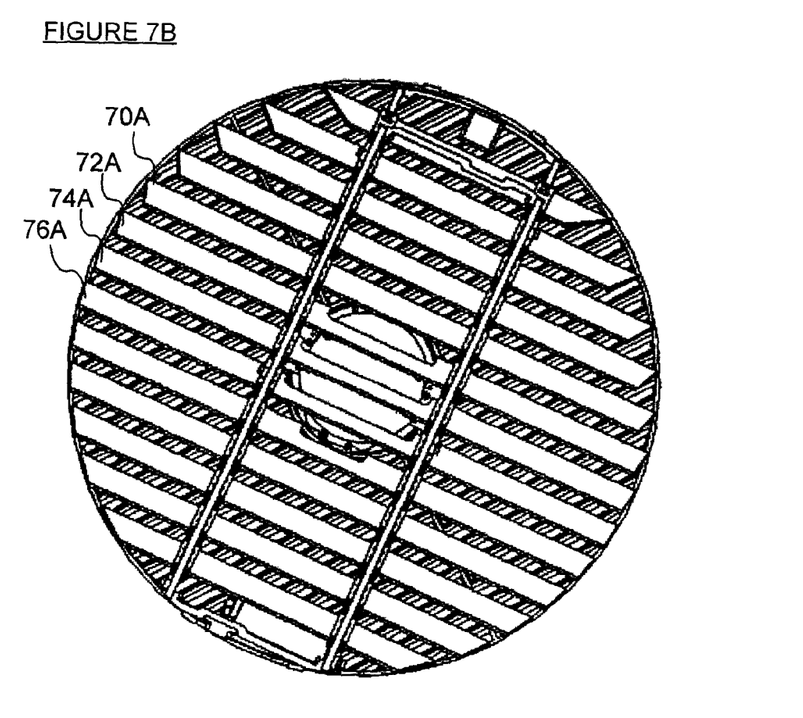
Figure 8A:
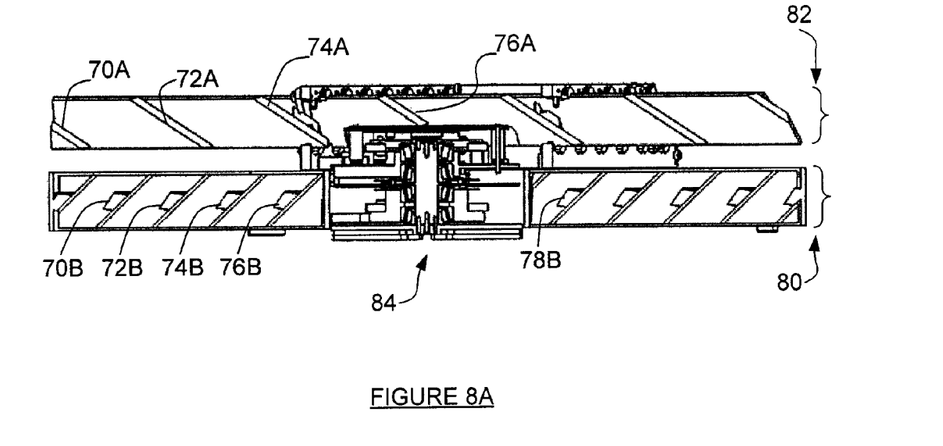
FIG. 8A is a side sectional view of a sunlight redirector corresponding to FIG. 6A.
Figure 8B:
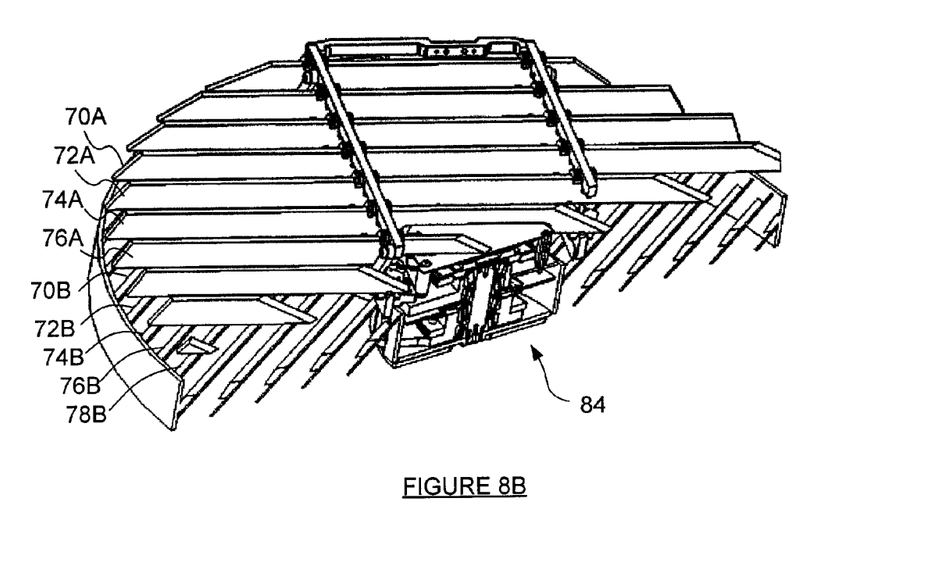
FIG. 8B is a partial oblique view of the outward side of a sunlight redirector corresponding to FIG. 6A.

In one sunlight redirector embodiment, a first assembly 80 (best seen in FIG. 8A but also shown in FIGS. 7A, 7B and 8B) incorporating non-movable inward segments 70B, 72B, 74B, 76B, 78B (i.e. segments which at all times remain in the first fixed position shown in FIG. 6A) is rotatable about a central vertical axis with respect to a second assembly 82 incorporating outward segments 70A, 72A, 74A, 76A. Rotation hub 84 (FIGS. 8A and 8B) incorporates bearings which rotatably support first and second assemblies 80, 82. In some other embodiments (not shown) it may be preferable—if cost and complexity considerations can be justified—to make additional provision for moving inward segments 70B, 72B, 74B, 76B, 78B twice per day as aforesaid.

The first fixed position (and, if provided, the second fixed position) of inward segments 70B, 72B, 74B, 76B, 78B is selected such that the overall efficiency of the sunlight redirector is approximately optimized throughout the day. The angular value which determines the fixed position can be determined utilizing computer ray trace simulations, in a manner well known to persons skilled in the art. A comparatively large range of suitable angular values will be capable of achieving the desired approximately optimized efficiency, since the angle at which light rays are incident on inward segments 70B, 72B, 74B, 76B, 78B can be controlled by suitably adjustably positioning outward segments 70A, 72A, 74A, 76A. The angular value which determines the fixed position need only be such that, for all sun positions between approximately 9:00 am and 5:00 pm, a substantial fraction of the incident sunlight rays are reflected by both the outward and inward segments, thus redirecting a substantial fraction of the incident sunlight rays into the light guide or light shaft at the desired angle.

It can thus be seen that when inward segments 70B, 72B, 74B, 76B, 78B are in the first fixed position shown in FIG. 6A they facilitate redirection of light rays by outward segments 70A, 72A, 74A, 76A at non-glancing angles, improving the sunlight redirector's overall light redirection efficiency. Without inward segments 70B, 72B, 74B, 76B, 78B, provision would have to be made for redirection by outward segments 70A, 72A, 74A, 76A of light rays incident on the redirector at glancing angles of incidence. That would be inefficient, since at glancing angles of incidence most light rays would pass between outward segments 70A, 72A, 74A, 76A without being reflected, and would therefore be lost in the sense that most such rays would not be redirected into the light guide or light shaft at the desired angle.

It is noteworthy that, whereas the embodiment of FIGS. 5A-5D utilizes interdependent pairs of inward/outward mirror segments; the embodiments of FIGS. 6A and 6B utilize outward mirror segments which are adjustably positionable independently of the inward mirror segments. This facilitates provision, in the embodiments of FIGS. 6A, 6B, 7A, 7B, 8A and 8B, of a larger number of smaller inward mirror segments (i.e. there can be more inward mirror segments than outward mirror segments; and each one of the inward mirror segments can be smaller than each one of the outward mirror segments) reducing both the cost and the thickness of the sunlight redirector.

While a number of exemplary aspects and embodiments have been discussed above, those of skill in the art will recognize certain modifications, permutations, additions and sub-combinations thereof.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A sunlight redirector, comprising:
   a first mirror array comprising a first plurality of substantially parallel, uniformly spaced, longitudinal outward mirror segments;
   a second mirror array comprising a second plurality of substantially parallel, uniformly spaced, longitudinal inward mirror segments; each one of the mirror segments having a normal vector;
   wherein:
   the outward mirror segments are adjustably positionable such that the outward mirror segments' normal vectors remain parallel; and
   the first mirror array is rotatable about a normal vector of the sunlight redirector and the second mirror array is mounted to rotate about the normal vector of the sunlight redirector independently of the first mirror array.

2. A sunlight redirector as defined in claim 1, wherein the inward mirror segments remain fixed in position.

3. A sunlight redirector as defined in claim 1, wherein the inward mirror segments are movable between a first fixed position and a second fixed position.

4. A sunlight redirector as defined in claim 1 wherein:
   the outward mirror segments are of different lengths and are arranged such that the first mirror array is circular; and
   the inward mirror segments are of different lengths and are arranged such that the second mirror array is circular.

5. A sunlight redirector as defined in claim 1 wherein the mirror segments redirect incident light rays into a desired direction substantially parallel to the normal vector of the sunlight redirector.

6. A sunlight redirector as defined in claim 1 wherein the angular orientation of the inward mirror segments is selected such that light rays reflected by the outward mirror segments onto the inward mirror segments are redirected by the inward mirror segments into a desired direction substantially parallel to the normal vector of the sunlight redirector.

7. A sunlight redirector as defined in claim 1 wherein a number of the inward mirror segments in the second mirror array is larger than a number of the outward mirror segments in the first mirror array.

8. A sunlight redirector as defined in claim 7 wherein the inward mirror segments of the second mirror array are narrower than the outward mirror segments of the first mirror array.

9. A sunlight redirector as defined in claim 1 wherein the outward mirror segments of the first mirror array each comprises an inward/outward pair of mirror segments that are mirrored on both sides wherein an angle of the outward mirror segment of each outward/inward pair of mirror segments is adjustable relative to an angle of the corresponding inner mirror segment.

10. A sunlight redirection method, comprising:
providing a first mirror array comprising a first plurality of substantially parallel, uniformly spaced, longitudinal outward mirror segments, each one of the outward mirror segments having a normal vector;
providing a second mirror array comprising a second plurality of substantially parallel, uniformly spaced, longitudinal inward mirror segments, each one of the inward mirror segments having a normal vector;
tracking the sun by:
adjustably positioning the outward mirror segments while maintaining substantially parallel alignment of the outward mirror segments' normal vectors; and
rotating the first mirror array about a normal vector of the first and second mirror arrays and,
independently of the first mirror array, rotating the second mirror array about the normal vector of the first and second mirror arrays.

11. A sunlight redirection method as defined in claim 10, further comprising maintaining an angle between the normal vectors of the inward mirror segments and the inward mirror segments in a fixed position.

12. A sunlight redirection method as defined in claim 10, further comprising maintaining the inward mirror segments in a fixed position in which light rays reflected by the outward mirror segments onto the inward mirror segments are redirected by the inward mirror segments into a desired direction substantially parallel to the normal vector of the first and second mirror arrays.

13. A sunlight redirection method as defined in claim 10, further comprising maintaining the inward mirror segments in either one of a first fixed position or a second fixed position.

14. A sunlight redirection method as defined in claim 10, further comprising maintaining angular orientation of the inward mirror segments such that light rays reflected by the outward mirror segments onto the inward mirror segments are redirected by the inward mirror segments into a desired direction substantially parallel to the normal vector of the first and second mirror arrays.

15. A sunlight redirection method, comprising:
providing a first mirror array comprising a first plurality of substantially parallel, uniformly spaced, longitudinal outward mirror segments, each one of the outward mirror segments having a normal vector;
providing a second mirror array comprising a second plurality of substantially parallel, uniformly spaced, longitudinal inward mirror segments, each one of the inward mirror segments having a normal vector;
tracking the sun by:
adjustably positioning the outward mirror segments while maintaining substantially parallel alignment of the outward mirror segments' normal vectors;
rotating the first mirror array about a normal vector of the first and second mirror arrays; and
once per day at a first selected time, moving the inward mirror segments from a first fixed position into a second fixed position; and once per day at a second selected time, moving the inward mirror segments from the second fixed position into the first fixed position.

16. A sunlight redirection method as defined in claim 15, wherein the first selected time is approximately 11:00 am, and
the second selected time is approximately 1:00 pm.

17. A sunlight redirection method as defined in claim 16 wherein when the inward mirror segments are in the first fixed position, light rays incident upon the outward segments are reflected onto the inward segments and further reflected by the inward segments in a desired direction substantially parallel to the normal vector of the first and second mirror arrays.

18. A sunlight redirection method as defined in claim 17 wherein when the inward mirror segments are in the second fixed position, light rays incident upon the outward segments are reflected in the desired direction by the outward segments without being further reflected by the inward segments.

19. A sunlight redirection method as defined in claim 16 wherein when the inward mirror segments are in the second fixed position, light rays incident upon the outward segments are reflected in the desired direction by the outward segments without being further reflected by the inward segments.

* * * * *